US007574983B2

United States Patent
Kuo

(10) Patent No.: US 7,574,983 B2
(45) Date of Patent: Aug. 18, 2009

(54) METHOD AND APPARATUS FOR EXTENDING HIGH LOAD OPERATION IN A HOMOGENEOUS CHARGE COMPRESSION IGNITION ENGINE

(75) Inventor: Tang-Wei Kuo, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/942,025

(22) Filed: Nov. 19, 2007

(65) Prior Publication Data

US 2008/0127931 A1  Jun. 5, 2008

Related U.S. Application Data

(60) Provisional application No. 60/868,096, filed on Dec. 1, 2006.

(51) Int. Cl.
*F02B 47/02* (2006.01)
*F02B 47/00* (2006.01)
(52) U.S. Cl. .................................. 123/25 C; 123/305
(58) Field of Classification Search ............... 123/25 C, 123/25 R, 25 A, 25 J, 295, 300, 304, 305, 123/430, 575
See application file for complete search history.

(56) References Cited

U.S. PATENT DOCUMENTS

| 4,143,518 | A | * | 3/1979 | Kellogg-Smith | ............ 60/712 |
| 4,541,367 | A | * | 9/1985 | Lindberg | ................. 123/25 M |
| 5,875,743 | A | * | 3/1999 | Dickey | ..................... 123/25 C |
| 6,311,651 | B1 | | 11/2001 | Singh | |
| 6,820,587 | B1 | | 11/2004 | Hoglund | |
| 6,994,072 | B2 | | 2/2006 | Kuo et al. | |
| 7,367,310 | B2 | * | 5/2008 | Kakuya et al. | ............... 123/295 |
| 2003/0192489 | A1 | * | 10/2003 | Singh | ........................ 123/25 C |
| 2004/0182359 | A1 | * | 9/2004 | Stewart et al. | .............. 123/295 |
| 2006/0005818 | A1 | | 1/2006 | Kuo et al. | |
| 2006/0016420 | A1 | | 1/2006 | Kuo et al. | |
| 2006/0016423 | A1 | | 1/2006 | Kuo et al. | |
| 2007/0022977 | A1 | * | 2/2007 | Crower | ..................... 123/25 C |
| 2008/0000445 | A1 | * | 1/2008 | Kim et al. | ................... 123/295 |

FOREIGN PATENT DOCUMENTS

JP          2005282542     * 10/2005

* cited by examiner

*Primary Examiner*—Mahmoud Gimie

(57) ABSTRACT

A method for controlling combustion within an internal combustion engine includes operating the engine in one of an HCCI and SI combustion modes and injecting water into a combustion chamber of the engine during at least periods of relatively high engine load conditions, the injecting water absorbing heat to reduce the occurrence of unintentional combustion ignition.

24 Claims, 2 Drawing Sheets

METHOD AND APPARATUS FOR EXTENDING HIGH LOAD OPERATION IN A HOMOGENEOUS CHARGE COMPRESSION IGNITION ENGINE

CROSS REFERENCE TO RELATED APPLICATIONS

This application claims the benefit of U.S. Provisional Application No. 60/868,096 filed on Dec. 1, 2006 which is hereby incorporated herein by reference.

TECHNICAL FIELD

This disclosure pertains generally to internal combustion engine control systems.

BACKGROUND

One engine system being developed for controlled auto-ignition combustion operation comprises an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions. Such engines are referred to as Homogeneous Charge Compression Ignition (hereinafter 'HCCI') engines.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

HCCI has been demonstrated in two-stroke gasoline engines using conventional compression ratios. It is believed that the high proportion of burnt gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and HCCI at part load is difficult to achieve. Known methods to induce HCCI at low and part loads include: 1) intake air heating, 2) variable compression ratio, and 3) blending gasoline with ignition promoters to create a more easily ignitable mixture than gasoline. In all the above methods, the range of engine speeds and loads in which HCCI can be achieved is relatively narrow. Extended range HCCI has been demonstrated in four-stroke gasoline engines using variable valve actuation with certain valve control strategies that effect a high proportion of residual combustion products from previous combustion cycle necessary for HCCI in a highly diluted mixture. With such valve strategies, the range of engine speeds and loads in which HCCI can be achieved is greatly expanded using a conventional compression ratio.

However, even with such valve control strategies, high load HCCI engine operation is limited by NOx emissions and by in-cylinder pressure rise or amplitude of pressure oscillation at high load. Too large a pressure rise or amplitude of pressure oscillation results in unacceptable combustion generated noise (i.e. knocking or ringing). And, since there is a relatively strong correlation between NOx emission and knock/ringing, either parameter may provide a capable indicator of a high load operating limit. Beyond an acceptable high load limit, the valve control strategy limits residual combustion products to effect in cylinder conditions which will not produce auto-ignition. At loads beyond the high load limit for HCCI combustion, the valve phasing is controlled at low lift to enable unthrottled spark-ignition (hereafter 'SI') combustion control in order to effect desired combustion phasing. An upper load limit and corresponding maximum torque output is reached with unthrottled SI combustion. Achieving engine output beyond the unthrottled SI combustion limit requires full valve lift operation and intake air throttling which increases engine pumping losses.

The HCCI combustion process is strongly influenced by combustion chamber surface temperature as seen, for example, in the correlation of engine coolant temperature or level of combustion chamber deposits to HCCI engine combustion phasing. More particularly, combustion phasing is known to advance with increasing coolant temperature or thickness of combustion chamber deposits. Although active coolant temperature control can be used to extend high load operation in both HCCI and SI modes of HCCI engines, the inherently long response time of engine thermal management systems does not enable rapid control adjustments necessary for dynamic cycle-to-cycle engine control.

SUMMARY

A method for controlling combustion within an internal combustion engine includes operating the engine in one of an HCCI and SI combustion modes and injecting water into a combustion chamber of the engine during at least periods of relatively high engine load conditions, the injecting water absorbing heat within the combustion chamber in order to reduce the occurrence of unintentional combustion ignition.

BRIEF DESCRIPTION OF THE DRAWINGS

One or more embodiments will now be described, by way of example, with reference to the accompanying drawings, in which.

DETAILED DESCRIPTION

Figure 1:
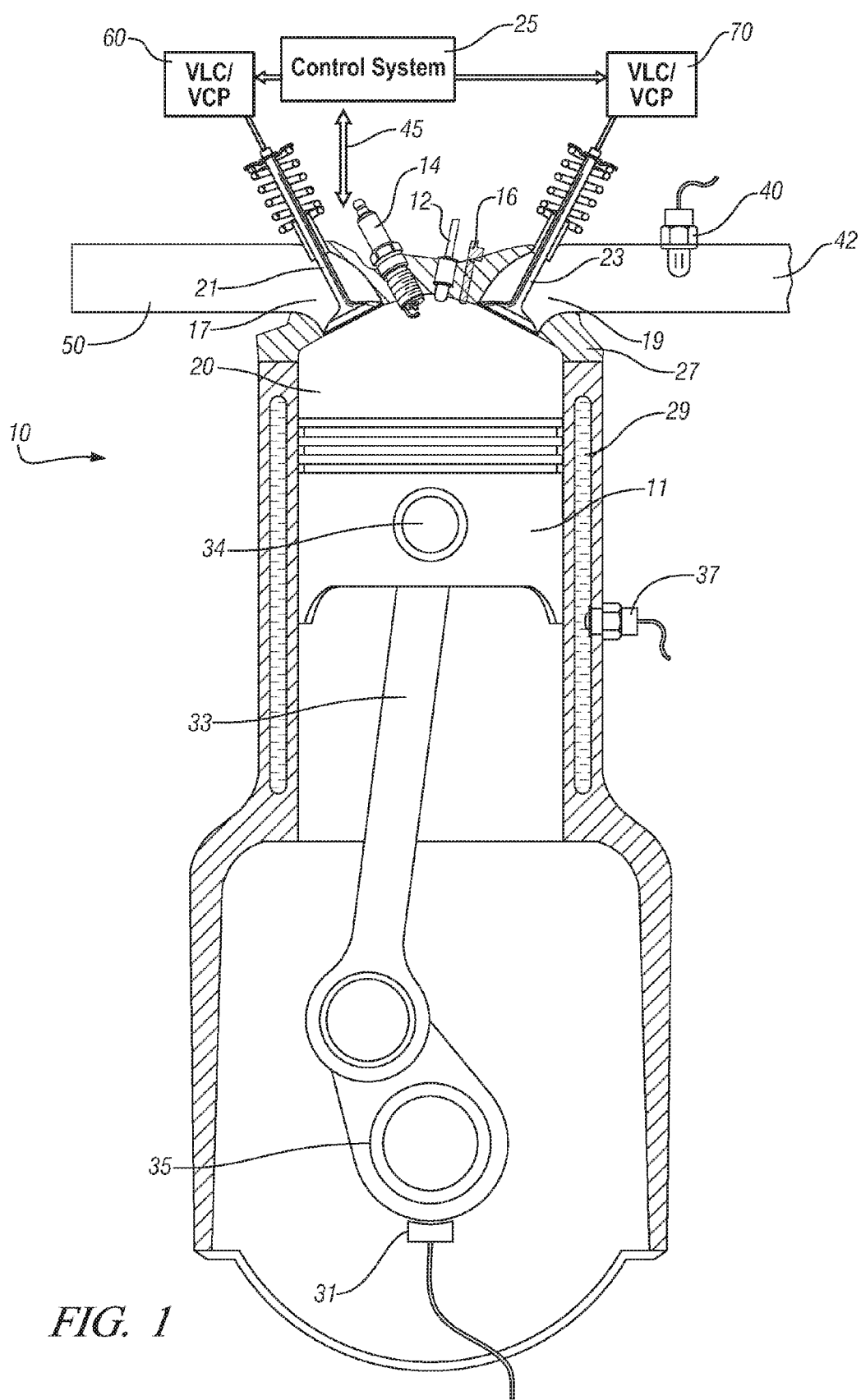
FIG. 1 is a schematic illustration of an exemplary internal combustion engine adapted for HCCI and SI operating modes in accordance with the present disclosure.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with an embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode.

The exemplary engine 10 comprises: a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. A valve actuation device, depicted as 60, is operative to control opening and closing of each of the intake valves 21, and a second valve actuation device 70 operative to control opening and closing of each of the exhaust valves 23. Each of the valve actuation devices 60, 70 comprises a device signally connected to the control system 25 and operative to control timing, duration, and magnitude of opening and closing of each valve, either in concert or individually. The first embodiment of the exemplary engine comprises a dual overhead cam system which has variable lift control ('VLC') and variable cam phasing ('VCP'). The VCP device is operative to control timing of opening or closing of each intake valve and each exhaust valve relative to rotational position of the crankshaft and opens each valve for a fixed crank angle duration. Exemplary VCP devices include well known cam phasers. The exemplary VLC device is operative to control magnitude of valve lift to one of two positions: one position to 3-5 mm lift for an open duration of 120-150 crank angle degrees, and another position to 9-12 mm lift for an open duration of 220-260 crank angle degrees. Exemplary VLC devices include well known two-step lift cams. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide parametric values for the exhaust gas feedstream, including air/fuel ratio, or measurement of exhaust gas constituents, e.g. NOx, CO, HC, and others. The system may include an in-cylinder sensor for monitoring combustion pressures, non-intrusive pressure sensors, or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and driveability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators of the engine 10 over appropriate interfaces 45. The control system 25 receives an engine torque command, and generates a desired torque output, based upon the operator inputs. Exemplary engine operating parameters that are sensed by control system 25 using the aforementioned sensors include engine coolant temperature, crankshaft rotational speed ('RPM') and position, manifold absolute pressure, ambient air flow and temperature, and, ambient air pressure. Combustion performance measurements typically comprise measured and inferred combustion parameters, including air/fuel ratio, location of peak combustion pressure, among others.

Actuators controlled by the control system 25 include: fuel injectors 12; the VCP/VLC valve actuation devices 60, 70;

spark plug 14 operably connected to ignition modules for controlling spark dwell and timing; exhaust gas recirculation (EGR) valve (not shown), and, electronic throttle control module (not shown), and water injector 16. Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in the HCCI mode, the engine does not utilize an energized spark plug. It has proven desirable to employ spark ignition to complement the HCCI mode under certain conditions, including, e.g. during cold start, at low load operating conditions near a low-load limit, and to prevent fouling. Also, it has proven preferable to employ spark ignition at a high load operation limit in the HCCI mode, and at high speed/load operating conditions under throttled or un-throttled spark-ignition operation.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

The fuel air mixture utilized to power engine 10 may include gasoline or gasoline blends, but the mixture may also comprise other flexible fuel types, such as ethanol or ethanol blends such as the fuel commonly known as E85. The methods described do not depend upon the particular variety of fuel used and are not intended to be limited to the embodiments disclosed herein.

Figure 2:
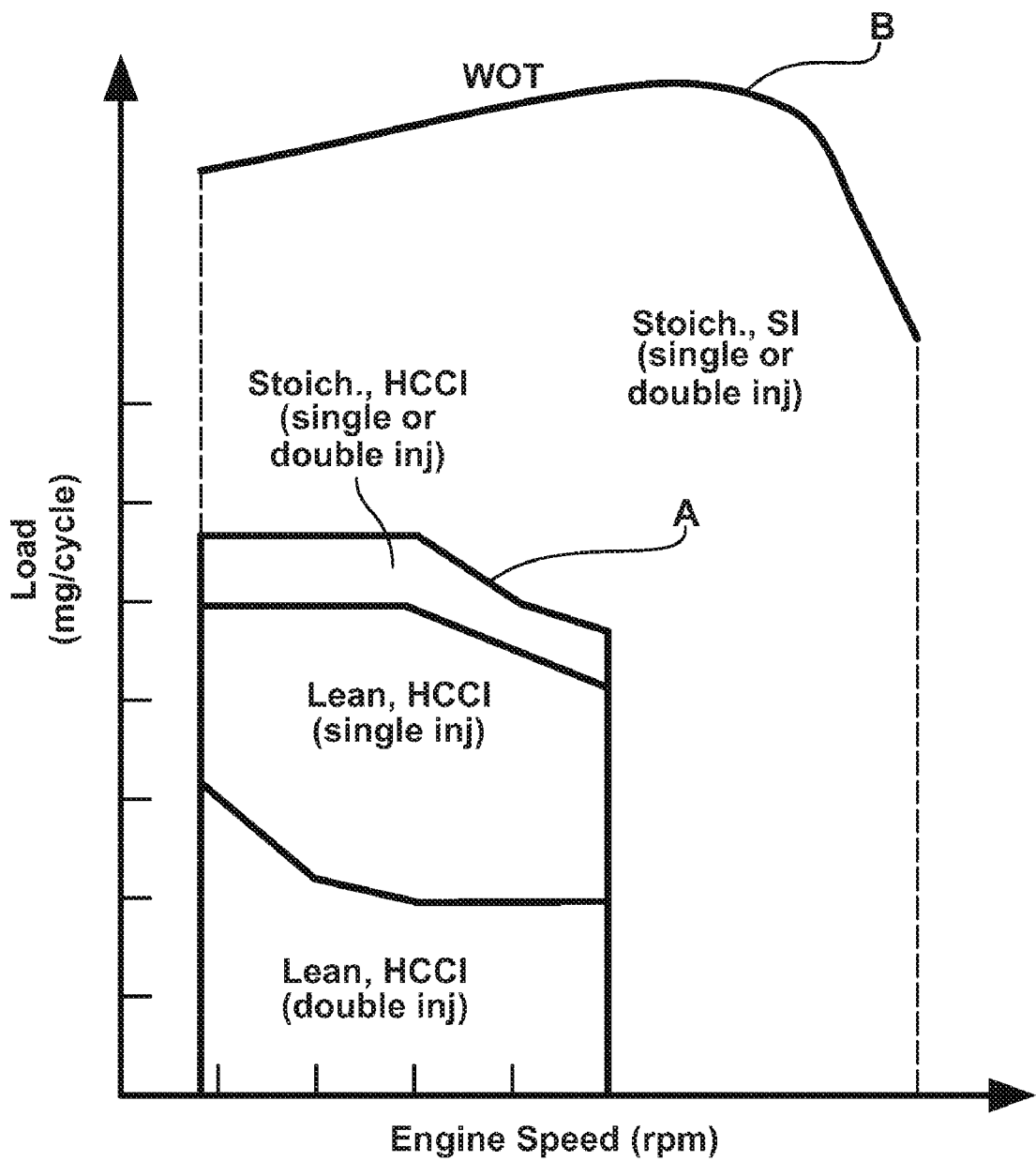
FIG. 2 is an illustration of operating regions of an exemplary engine including HCCI and SI modes of operation in accordance with the present disclosure.

Referring now to FIG. 2, an exemplary mapping of combustion modes under various engine speed vs. load conditions for the exemplary dual overhead cam engine with variable valve actuation system having dual cam phasers and 2-step lifter system. The exemplary engine is operative in HCCI mode, over a range of engine speeds ('rpm') and loads as represented by fuel mass ('mg/cycle'). Line A depicts an upper limit for operating the engine in a stoichiometric HCCI mode. The stoichiometric SI mode comprises operating by either a) traditional intake air throttling or b) unthrottled intake using VLC/VCP to control the amount of air induction in the air intake system. Line B depicts an upper limit for operating the engine in an enriched, wide-open-throttle (WOT) SI mode also referred to as the peak torque engine operation.

The highest load attainable in the HCCI mode is limited by ringing or knocking. The HCCI ringing limit results from an inability to induct sufficient charge dilution with the prescribed low lift cams. Insufficient dilution of the fuel air mixture results in higher combustion temperatures. This ultimately results in higher in-cylinder temperatures including combustion gases and combustion chamber surfaces. The highest attainable load with SI operation is limited by either knocking or intake and exhaust gas flows through the air intake system.

Referring still to FIG. 2, it can be appreciated that extending the high load limit for operating the engine in a stoichiometric HCCI mode (Line A) would provide the benefits of HCCI combustion (e.g. fuel economy) over a larger operating region of the engine. And, it can be appreciated that extending the high load limit for SI mode would benefit engine power density through extended torque output at WOT.

Therefore, in accordance with the present disclosure, extension of the HCCI and SI mode high load limits is effected by controlled introduction of water into the combustion chamber during those modes of operation. In a preferred method of water injection in two- and four-stroke applications, water is injected during the expansion stroke preferably during or after the main combustion period. Spray is directed in a manner to impinge upon one or more combustion chamber surfaces. For example, in the exemplary schematic of the engine in FIG. 1, water injector 16 is located centrally within the engine head 27 to direct spray predominantly against the crown of piston 11. Alternative locations, spray patterns, stream and droplet size and combinations thereof may effect spray impingement upon alternative surfaces of the combustion chamber including cylinder walls, engine head 27 and valves 21, 23. More particularly, certain combustion chamber "hot-spots" identified experimentally, empirically, predictively, through modeling or other techniques may be chosen as the most appropriate surfaces for water spray impingement since such "hot-spots" may effect undesirably premature auto-ignition. Additionally or alternatively, surfaces most likely to accumulate contaminants such as soot, carbon deposits, or other by-products from the combustion process may be chosen for water impingement. Contaminants present within the combustion chamber can accumulate heat and be a source of early or disordered ignition of the charge. Water sprayed upon these surfaces, identified experimentally, empirically, predictively, through modeling or other techniques, can reduce the formation of contaminant deposits, dislodge the deposits, saturate and cool the deposits, or increase the oxidation of the contaminants. In this way, combustion chamber surfaces are directly cooled by the water injection as heat is transferred to the liquid thereby. Additionally, evaporation of the water spray is effective during the expansion stroke to absorb heat of combustion thereby limiting combustion gas temperatures which contribute to undesirable ringing, and NOx and soot emissions. And, the steam generated by water injection contributes additional work to the piston as it recedes during the expansion stroke thereby extracting more work from the combustion process for an overall more thermally efficient cycle.

In another embodiment of a method of water injection in two- and four-stroke applications, water is injected before or during the main combustion period. As previously mentioned, dilution of charge is a known method to lower combustion temperatures and control the amount of heat released within the combustion chamber. However, valve control strategies utilized in HCCI operation limit the amount of dilution that may be introduced to the combustion process. Water injection at a time before the main combustion period provides an opportunity to increase charge dilution without affecting valve strategies. Water introduced in the form of small droplets to the combustion chamber in the period just prior to combustion, wherein the charge is significantly compressed and therefore at high temperature, absorbs heat from the combustion chamber and the gases therein and is easily evaporated into water vapor. Water vapor in a fuel air mixture acts as an inert gas causing dilution of charge. The resulting diluted fuel air charge burns at a lower temperature than an undiluted charge, and as a result, less heat flows from the combusted gas to the combustion chamber. In this way, water droplets sprayed into the combustion chamber prior to the main combustion process absorb heat from the combustion chamber and increase charge dilution to reduce the generation of additional heat.

A unique HCCI engine includes a six-stroke engine adapted for HCCI and SI modes of operation and includes water injection. Generally, such a six-stroke implementation includes an engine substantially as described with respect to FIG. 1. The engine cycle includes exhaust, intake, compression and combustion expansion processes including fuel system and valve controls effective to establish HCCI mode combustion and, with the addition of spark ignition control, effective to establish SI mode combustion as appropriate for the engine conditions including load and speed. However, subsequent to the expansion stroke, the combusted gases are subjected to a recompression stroke wherein intake and exhaust valve remain closed, for example through valve deactivation hardware. The recompression stroke is then followed by a re-expansion stroke wherein the intake and exhaust valves remain closed. Following this second expansion stroke is the exhaust stroke first mentioned herein above. In a six-stroke HCCI engine as described, the water is preferably injected during the recompression stroke though the subsequent re-expansion stroke may also receive water injection.

Certain embodiments and configurations may be useful to the implementation of the methods disclosed herein. For example, it is well known that the introduction of water to a system may increase corrosion to certain materials. The addition of corrosion resistant coatings or treatments well known in the art may be beneficial to the combustion chamber in order to compensate for any additional corrosion caused by the water injection methods disclosed herein. Additionally, the spray pattern discussed within this disclosure will take many particular forms for individual combustion chamber configurations. Testing in some exemplary engines has shown that spray patterns directed primarily toward the crown of the piston or the head tend to be especially efficient areas to direct the water spray in order to transfer heat from the combustion chamber to the water spray.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling combustion within an internal combustion engine including a reciprocating piston having a compression stroke followed by a combustion expansion stroke, comprising:
   operating said engine in one of an HCCI and SI combustion modes, wherein said HCCI and SI combustion modes each having a high load limit for operating said engine;
   injecting water into a combustion chamber of said engine during at least periods of relatively high engine load conditions during the combustion expansion stroke to thereby generate steam from said water effective to contribute work to the piston; and
   wherein the injection of water into said combustion chamber during the combustion expansion stroke further operates to extend said high load limit of said HCCI and SI combustion modes for operating said engine.

2. The method of claim 1, said injecting water comprising forming a spray pattern to impinge upon an area of relatively higher temperatures within said combustion chamber.

3. The method of claim 1, said injecting water comprising forming a spray pattern to impinge upon surfaces of said combustion chamber, said forming a spray pattern removing combustion by-product deposits from said surfaces of said combustion chamber.

4. The method of claim 1, wherein said internal combustion engine operates cyclically through six stroke combustion process.

5. The method of claim 1, wherein said internal combustion engine operates cyclically in a four stroke combustion process.

6. The method of claim 1, wherein said internal combustion engine operates cyclically in a two stroke combustion process.

7. Reciprocating piston internal combustion engine cycle, comprising:
   exhaust, intake, compression and combustion expansion stroke processes conducive to one of HCCI and SI combustion, wherein said HCCI and SI combustion each having a high load limit for operating said engine;
   a water injection process wherein water is injected into a combustion chamber of the engine during the combustion expansion stroke to thereby generate steam from said water effective to contribute work to the piston; and,
   wherein said water injection process during combustion expansion further operates to extend said high load limits of said HCCI and SI combustion for operating said engine.

8. The cycle of claim 7, wherein said water injection process includes at least a portion of the injected water impinging upon an area of higher relative temperature upon said combustion chamber surface.

9. An apparatus for controlling combustion within an internal combustion engine including a reciprocating piston having a compression stroke followed by a combustion expansion stroke, comprising:
   a combustion chamber combusting a fuel air mixture in one of HCCI and SI combustion modes, wherein said HCCI and SI combustion modes each having a high load limit for operating said engine; and
   water injection apparatus for controlling water injection into said combustion chamber during the combustion expansion stroke to thereby generate steam from said water effective to contribute work to the piston, wherein the injection of water into said combustion chamber during the combustion expansion stroke further operates to extend said high load limit of said HCCI and SI combustion modes for operating said engine.

10. The apparatus of claim 9, wherein said water injection apparatus injects water onto a surface of said combustion chamber exhibiting relatively higher temperatures.

11. The apparatus of claim 9, wherein said water injection apparatus injects water onto a surface of said combustion chamber in order to remove combustion by-product deposits.

12. The apparatus of claim 9, wherein said water injection apparatus injects water in a spray pattern comprising small droplets, said small droplets absorbing heat and vaporizing inside said combustion chamber to create water vapor.

13. The apparatus of claim 9, wherein said water injection apparatus injects water onto a surface of said combustion chamber known to aggregate combustion by-product deposits.

14. The apparatus of claim 9, wherein said internal combustion engine operates cyclically in a two stroke combustion process.

15. The apparatus of claim 9, wherein said internal combustion engine operates cyclically in a four stroke combustion process.

16. The apparatus of claim 9, wherein said internal combustion engine operates cyclically in a six stroke combustion process.

17. The method of claim 9, said injecting water comprising forming a spray pattern to impinge upon a surface of said combustion chamber known to aggregate combustion by-product deposits.

18. A method for controlling combustion within an internal combustion engine, said method comprising:
    operating said engine in an HCCI combustion mode, wherein said HCCI combustion mode operates cyclically in a six stroke combustion process including a reciprocating piston having, in order, an intake stroke, a compression stroke, an expansion stroke, a re-compression stroke, a re-expansion stroke, and an exhaust stroke; and
    injecting water into a combustion chamber of said engine during one of said re-compression and re-expansion strokes, wherein the injection of water operates to extend said high load limit of said HCCI combustion mode for operating said engine.

19. The method of claim 18, said injecting water comprising forming a spray pattern to impinge upon an area of relatively higher temperatures within said combustion chamber.

20. The method of claim 18, said injecting water comprising forming a spray pattern to impinge upon surfaces of said combustion chamber, said forming a spray pattern removing combustion by-product deposits from said surfaces of said combustion chamber.

21. An apparatus for controlling combustion within an internal combustion engine operating cyclically in a six stroke combustion process, comprising:
    a reciprocating piston having, in order, an intake stroke, a compression stroke, an expansion stroke, a re-compression stroke, a re-expansion stroke, and an exhaust stroke;
    a combustion chamber combusting a fuel air mixture in an HCCI combustion mode; and
    water injection apparatus for controlling water injection into said combustion chamber during one of said re-compression and re-expansion strokes, wherein the injection of water operates to extend said high load limit of said HCCI combustion mode for operating said engine.

22. The apparatus of claim 21, wherein said water injection apparatus injects water onto a surface of said combustion chamber exhibiting relatively higher temperatures.

23. The apparatus of claim 21, wherein said water injection apparatus injects water onto a surface of said combustion chamber in order to remove combustion by-product deposits.

24. The apparatus of claim 21, wherein said water injection apparatus injects water onto a surface of said combustion chamber known to aggregate combustion by-product deposits.

* * * * *